July 4, 1961   E. T. SHERWOOD ET AL   2,991,376
PORTABLE POWER UNIT

Filed Oct. 3, 1957   2 Sheets-Sheet 1

INVENTORS
EDWIN T. SHERWOOD
ROBERT SCHIMEK
BY John W. Michael
ATTORNEY

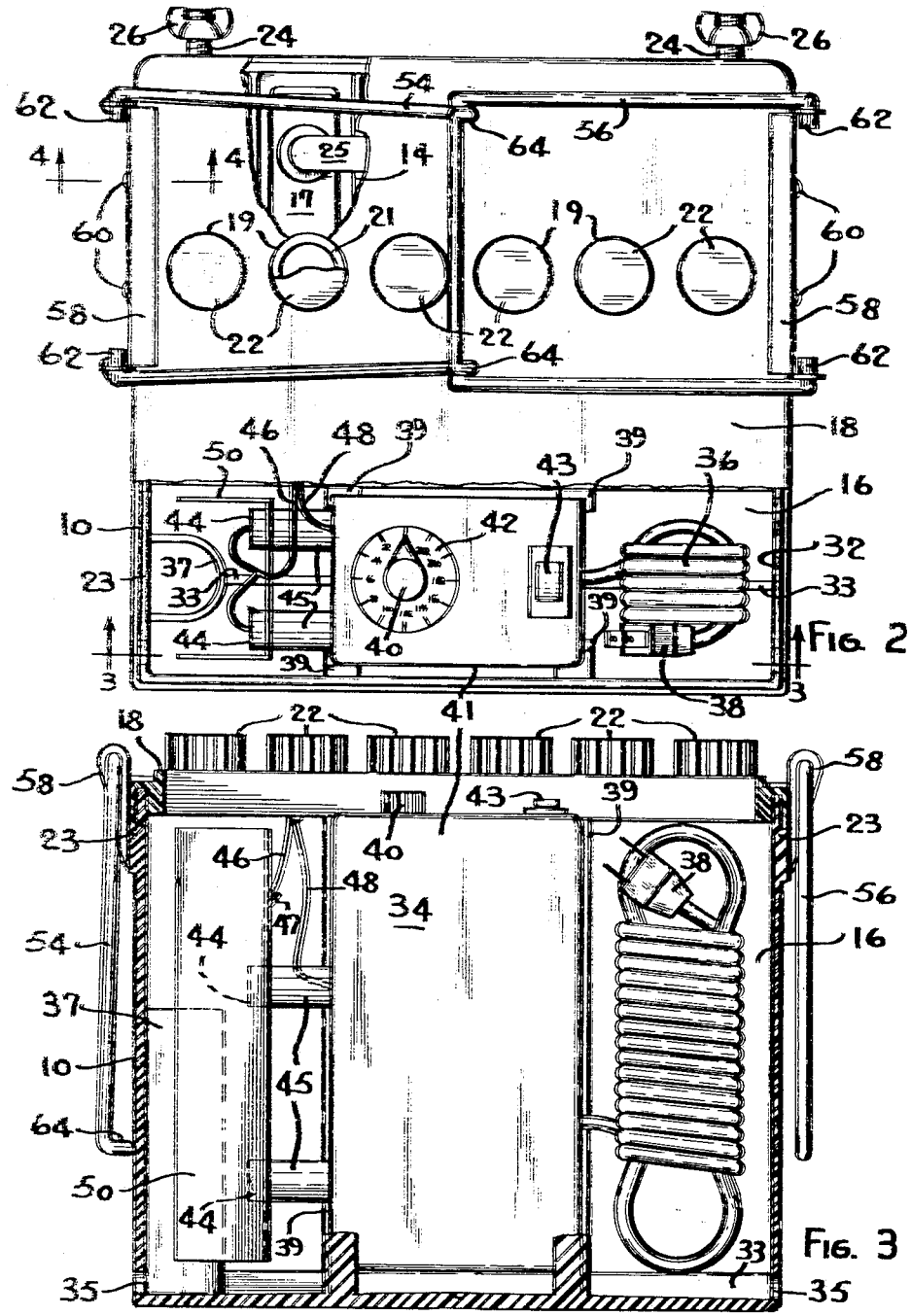

United States Patent Office 2,991,376
Patented July 4, 1961

2,991,376
PORTABLE POWER UNIT
Edwin T. Sherwood, Bayside, and Robert Schimek, Milwaukee, Wis., assignors to Globe-Union Inc., Milwaukee, Wis., a corporation of Delaware
Filed Oct. 3, 1957, Ser. No. 687,891
5 Claims. (Cl. 307—156)

This invention relates to a portable power unit which includes a storage battery and means for charging the battery in a single portable compact unit.

Units of this type, while having a wide variety of applications, are particularly adaptable as a power source for use with motor boats to start the motor and run other electrical equipment such as running lights, etc. The unit should be light and compact to permit removal from the boat when not in use and the battery must be charged periodically to maintain its rated potential. It is desirable, therefore, that a means for properly charging the battery be available at all times to permit charging wherever a source of alternating current is available.

It is the object of this invention, therefore, to provide a portable power unit which is compact and easily carried and which can be charged under proper control without additional equipment whenever a source of alternating current is available.

A unit embodying this invention includes a single casing having a battery compartment and a charging compartment formed therein. Battery cells are formed integral within the battery compartment and have separate cell covers. A one-piece main cover fits on and is sealed to the casing to enclose the battery compartment, and create a framed opening for the charging compartment. An auxiliary cover hinged on the main cover covers such framed opening. The main cover has openings for the bosses containing the vent openings of the cell covers. Suitable battery elements, cell connectors, and electrolyte form a lead-acid storage-type battery in such battery compartment which thereby serves as the container for the storage battery. The battery terminals are brought out through either the side or top of the casing.

Charging means including a timer, a transformer, and a rectifier permanently connected to the battery terminals within the battery compartment is mounted in the charging compartment of the casing to permit charging the battery wherever a suitable source of alternating current is available.

Special handles properly aligned with the center of gravity of the unit may be interlocked for one-hand carrying and fold alongside the casing when not in use.

Other objects and advantages will be pointed out in, or be apparent from the specification and claims, as will obvious modifications of the embodiment shown in the drawings, in which:

FIG. 2 is a top plan view of the unit with part of the main cover broken away and the auxiliary cover removed;

FIG. 3 is a sectional view taken along line 3—3 of FIG. 2; and

Figure 1:
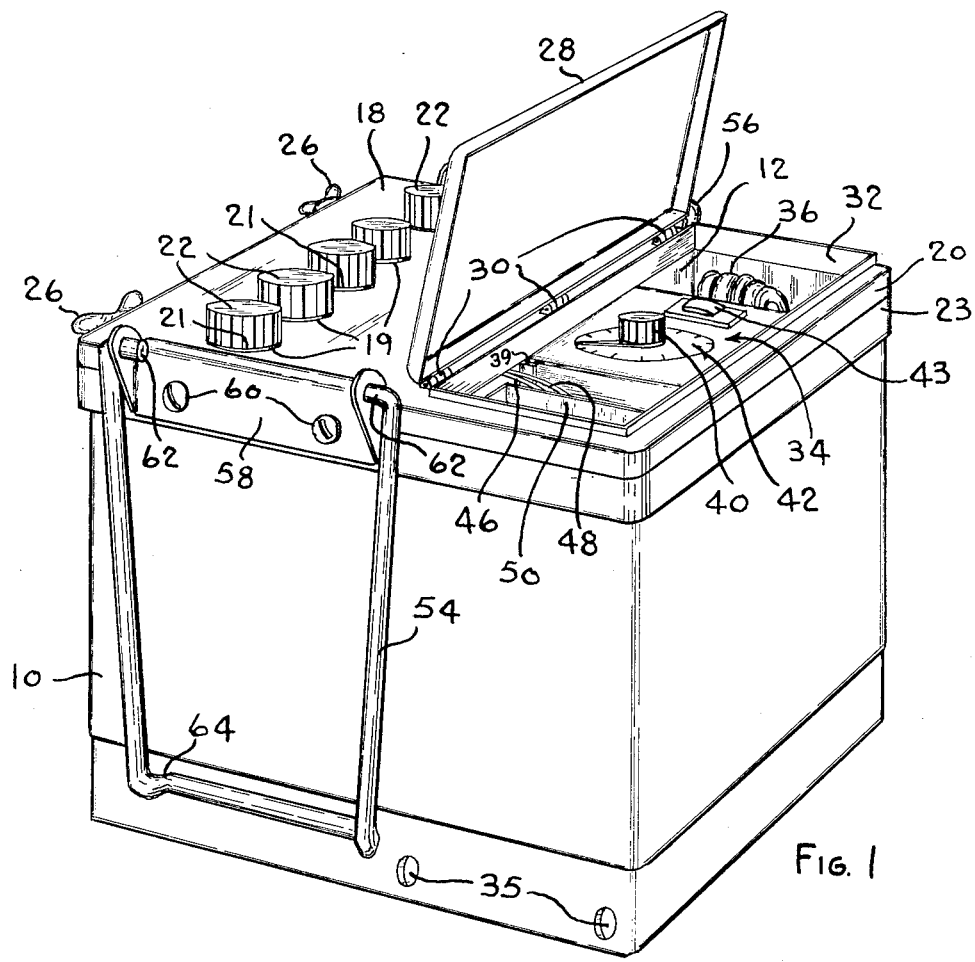
FIG. 1 shows a perspective view of the portable power unit embodying the present invention.

The portable unit includes a one-piece molded type casing 10 of hard rubber, plastic, or bituminous composition with an integral vertical partition wall 12 dividing the casing into a battery compartment 14 and a charging compartment 16. Battery compartment 14 of casing 10 serves as the battery container for the storage battery and thus is a part of the battery. The battery compartment is divided into six battery cells, each with its own cell cover 17. A one-piece main cover 18 has a downwardly extending flange 20 which fits over the top of the casing 10 and rests on the top of a raised portion 23 surrounding the casing. Both covers 17 and 18 are sealed, thereby sealing the battery cells and also sealing the area on top of the individual cell covers to prevent moisture from causing current leakage across the cells. The main cover has openings 19 (see FIG. 2) through which bosses 21 containing the vent openings in the cell covers extend. Leakproof vent plugs 22 are threadably engaged with the bosses 21. Conventional battery elements in the battery cells are connected by cell connectors 25 and the positive elements at one end and the negative elements at the other end are respectively connected to terminals 24 which extend either laterally out through the wall of the casing 10 below the main cover 18 as shown or vertically through the cover. The electrolyte is introduced into the battery cells through the vent openings.

Wing nuts or studs 26 may be threaded on terminals 24 to fasten leads to such terminals.

The main cover 18 has a framed opening 32 for the charging compartment 16 which is closed by an auxiliary cover 28. This cover is pivotally mounted at 30 to the main cover. When open it provides access to the charging means mounted in the charging compartment 16 and when closed it effectively seals the compartment from the elements. Auxiliary cover 28 is opened while charging to ventilate the compartment and prevent overheating while charging.

Means for charging the battery is mounted in the charging compartment 16. This compartment has an integral rib 33 extending from the bottom thereof and may contain drain holes 35 to prevent damage to the charging equipment by water collecting therein. A semi-circular wall 37 in compartment 16 provides a convenient storage well for a hydrometer used to check the specific gravity of the battery electrolyte.

The means for charging the battery is a removable replaceable unit indicated generally at 34. This unit includes a main housing 41 mounted in the central portion of compartment 16 between supporting guides 39. This housing contains a transformer, an electric timer with operating knob 40, and an indicating light 43. These elements are connectible to a source of alternating current electricity by an electrical power cord 36 having a plug 38. This cord, when not in use, is stored on the right hand side of the charging compartment 16. The unit 34 also includes a full wave rectifier. The type shown consists of a pair of germanium diodes 44 mounted within a U-shaped mounting fin and shield 50 and secured to the housing 41 by ceramic spacers 45. The output side of the rectifier is connected to one terminal of the battery by wire 46 connected to tab 47 on shield 50. The middle tap of the secondary of the transformer is connected to the other terminal of the battery by wire 48. Wires 46 and 48 are connected to the charger terminals by suitable connectors (not shown) to facilitate removal of charging unit 34. After the plug 38 is connected to a source of A.C. voltage the unit will start to charge the battery when the timer knob 40 is rotated in a clockwise direction for the desired charge period as indicated by a timer dial 42 calibrated in units of time.

Figure 4:
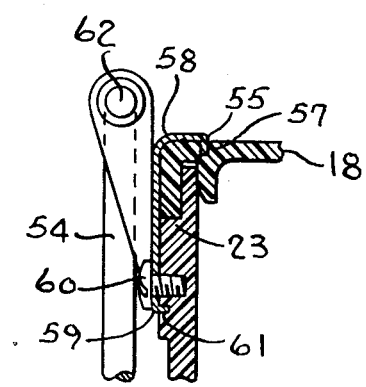
FIG. 4 is an enlarged fragmentary sectional view taken along line 4—4 of FIG. 2.

Coated steel handles 54 and 56 are pivotally mounted in brackets 58. These brackets, see FIG. 4, have a top tongue 55 which seats in a groove 57 in the top of the cover 18 and a bottom tongue 59 which seats in a groove 61 in the raised portion 23 of the casing. Screws 60 fasten the brackets 58 to the sides of the casing thus providing a lock (additional to any seals) for holding the cover to the casing. The center of the brackets 58 is substantially aligned with the center of gravity of the power unit. This results in an offset relationship which compensates for the unequal weight of the battery in compartment 14 and the charging means in compartment 16 and makes the unit easier to carry.

The handles are of substantially U-shape with the bent ends 62 for pivotal connection in brackets 58. When the handles are not in use they may be folded down along the sides of the casing as shown in FIGS. 1 and 3. In this position the handles may be engaged by suitable hold-down clamps (not shown) to secure the unit to the deck of a boat for example. The unit can be easily carried by one or two persons. If two persons are available the unit is carried by each person grasping one of the handles (which have been swung up) and supporting the unit between them. For one person to carry the unit the handles are swung upwardly from the position shown in FIGS. 1 and 3 to that shown in FIG. 2. The free end of the handle 54 at the base of the U is offset as at 64 and will interlock with the free end of handle 56 to thereby provide a unitary member for carrying the unit by one hand.

Although but one embodiment of the present invention has been illustrated and described, it will be apparent to those skilled in the art that various changes and modifications may be made therein without departing from the spirit of the invention or from the scope of the appended claims.

We claim:

1. A portable power unit comprising, a single casing having a partition forming a battery compartment and a charging compartment, said battery compartment serving as a battery container and having battery cells therein which are interconnected to form a storage battery, separate covers for said cells sealed to said cells and having bosses with vent openings therein, a charging unit carried in said charging compartment and adapted for charging said storage battery, a main cover for said casing and sealed thereto having openings therein to receive said bosses, said main cover having an opening therein providing access to said charging unit, and a hinged auxiliary cover for said opening.

2. A portable power unit comprising, a single casing having a partition forming a battery compartment and a charging compartment, said battery compartment serving as a battery container and having battery cells therein which are interconnected to form a storage battery, separate covers for said cells sealed to said cells and having bosses with vent openings therein, a charging unit carried in said charging compartment and adapted for charging said storage battery, and a main cover for said casing and sealed thereto having openings therein to receive said bosses, said main cover being secured to said casing by brackets mounted on said main cover and having a tongue engaging said main cover and a tongue engaging said casing to hold said cover on said casing.

3. A portable power unit according to claim 2 in which said casing has handles mounted on said brackets, said handles comprising two substantially U-shaped members pivotally connected to said brackets so they can be swung to a position along side said casing when not in use, one of said handles having the base of the U-shaped member offset slightly from the plane of said member so the handles will interlock each other to provide a unitary carrying member when swung into position for use.

4. A portable power unit comprising, a single casing having a partition forming a battery compartment and a charging compartment, said battery compartment serving as a battery container and having battery cells therein which are interconnected to form a storage battery, separate covers for said cells sealed to said cells and having bosses with vent openings therein, a charging unit carried in said charging compartment and adapted for charging said storage battery, a main cover for said casing and sealed thereto having openings therein to receive said bosses, and a pair of terminals extending laterally from said casing below said cover, said terminals being connected to said storage battery and adapted for connection with equipment to be powered by said unit.

5. A portable power unit comprising, a single casing having a partition forming a battery compartment and a charging compartment, said battery compartment serving as a battery container and having battery cells therein which are interconnected to form a storage battery, a charging unit carried in said charging compartment and adapted for charging said storage battery, a cover for said casing and sealed thereto having cell filling openings therein, brackets secured to opposite sides of said unit, and handles mounted on said brackets, said handles comprising two substantially U-shaped members pivotally connected to said brackets so they can be swung to a position along side said casing when not in use, said handles having bases which lie against each other so they can be gripped simultaneously by one hand.

References Cited in the file of this patent

UNITED STATES PATENTS

| | | |
|---|---|---|
| 1,329,799 | Sandell | Feb. 3, 1920 |
| 1,518,508 | Hart | Dec. 9, 1924 |
| 2,663,391 | Kuhns | Dec. 22, 1953 |

FOREIGN PATENTS

| | | |
|---|---|---|
| 747,780 | France | Apr. 4, 1933 |